(12) United States Patent
Gilbert et al.

(10) Patent No.: US 7,274,910 B2
(45) Date of Patent: Sep. 25, 2007

(54) ADVANCED CAPABILITY RFID SYSTEM

(75) Inventors: Ronald W. Gilbert, Morgan Hill, CA (US); Kerry D. Steele, Kennewick, WA (US); Gordon A. Anderson, Benton City, WA (US)

(73) Assignee: Battelle Memorial Institute K1-53, Richland, WA (US)

( * ) Notice: Subject to any disclaimer, the term of this patent is extended or adjusted under 35 U.S.C. 154(b) by 478 days.

(21) Appl. No.: 10/775,023

(22) Filed: Feb. 9, 2004

(65) Prior Publication Data
US 2005/0176373 A1 Aug. 11, 2005

(51) Int. Cl.
H04B 7/00 (2006.01)
(52) U.S. Cl. .................. 455/41.2; 455/41.1; 340/10.1; 340/10.3
(58) Field of Classification Search ............... 455/41.2, 455/41.1; 340/10.1, 10.3, 572.1, 572.3
See application file for complete search history.

(56) References Cited

U.S. PATENT DOCUMENTS

| | | | | |
|---|---|---|---|---|
| 4,161,698 A | | 7/1979 | Klank | .......................... 325/468 |
| 4,237,556 A | | 12/1980 | Naito | .......................... 455/154 |
| 5,030,807 A | | 7/1991 | Landt et al. | ................. 235/375 |
| 6,061,614 A | | 5/2000 | Carrender et al. | ............. 701/33 |
| 6,104,281 A | * | 8/2000 | Heinrich et al. | ............ 340/10.5 |
| 6,720,866 B1 | | 4/2004 | Sorrells et al. | ............. 340/10.4 |
| 2002/0039885 A1 | * | 4/2002 | Weissman et al. | ............. 455/20 |
| 2003/0063910 A1 | * | 4/2003 | Hattori | ........................ 396/611 |
| 2003/0220835 A1 | * | 11/2003 | Barnes | ......................... 705/14 |
| 2006/0082445 A1 | * | 4/2006 | O'Toole et al. | ............. 340/10.4 |
| 2006/0145855 A1 | * | 7/2006 | Diorio et al. | ............. 340/572.1 |

FOREIGN PATENT DOCUMENTS

GB  2 297 225 A  7/1996

\* cited by examiner

*Primary Examiner*—Matthew Anderson
*Assistant Examiner*—Tuan Pham
(74) *Attorney, Agent, or Firm*—Seed IP Law Group PLLC

(57) ABSTRACT

A radio-frequency transponder device having an antenna circuit configured to receive radio-frequency signals and to return modulated radio-frequency signals via continuous wave backscatter, a modulation circuit coupled to the antenna circuit for generating the modulated radio-frequency signals, and a microprocessor coupled to the antenna circuit and the modulation circuit and configured to receive and extract operating power from the received radio-frequency signals and to monitor inputs on at least one input pin and to generate responsive signals to the modulation circuit for modulating the radio-frequency signals. The microprocessor can be configured to generate output signals on output pins to associated devices for controlling the operation thereof. Electrical energy can be extracted and stored in an optional electrical power storage device.

12 Claims, 3 Drawing Sheets

ADVANCED CAPABILITY RFID SYSTEM

STATEMENT REGARDING FEDERALLY SPONSORED RESEARCH OR DEVELOPMENT

This invention was made with U.S. Government support under Contract DE-AC06-76RL01830 awarded by the U.S. Department of Energy. The U.S. Government has certain rights in the invention.

BACKGROUND OF THE INVENTION

1. Field of the Invention

The present invention pertains to passive and semi-passive radio-frequency identification systems and, more particularly, to a microprocessor-based RFID system for monitoring and controlling remote devices.

2. Description of the Related Art

Radio-frequency tags are becoming common for remote inventory of items that are associated with the tags. Typically, the tags have a memory containing information about the respective items. The stored information is communicated to a remote reader via continuous wave backscatter modulation in response to an interrogation signal.

As shown in FIG. 1, a basic RFID system 10 includes two components: an interrogator or reader 12, and a transponder (commonly called an RF tag) 14. The interrogator 12 and RF tag 14 include respective antennas 16, 18. In operation, the interrogator 12 transmits through its antenna 16 a radio-frequency interrogation signal 20 to the antenna 18 of the RF tag 14. In response to receiving the interrogation signal 20, the RF tag 14 produces an backscatter modulated response signal 22 that is reflected back to the interrogator 12 through the tag antenna 18. This process is known as modulated backscatter.

The conventional RF tag 14 includes an amplitude modulator 24 with a switch 26, such as a MOS transistor, connected between the tag antenna 18 and ground. When the RF tag 14 is activated by the interrogation signal 20, a driver (not shown) creates a modulating signal 28 based on an information code, typically an identification code, stored in a non-volatile memory (not shown) of the RF tag 14. The modulating signal 28 is applied to a control terminal of the switch 26, which causes the switch 26 to alternately open and close. When the switch 26 is open, the tag antenna 18 reflects a portion of the interrogation signal 20 back to the interrogator 12 with one amplitude and phase as a portion 28 of the response signal 22. When the switch 26 is closed, the tag antenna reflects a second amplitude phase. In other words, the interrogation signal 20 is amplitude-modulated to produce the response signal 22 by alternately reflecting and absorbing at a different amplitude and phase the interrogation signal 20 according to the modulating signal 28, which is characteristic of the stored information code. Upon receiving the response signal 22, the interrogator 12 demodulates the response signal 22 to decode the information code represented by the response signal.

The substantial advantage of RFID systems is the non-contact, non-line-of-sight capability of the technology. The interrogator 12 emits the interrogation signal 20 with a range from one inch to one hundred feet or more, depending upon its power output and the radio-frequency used. Tags can be read through a variety of parameters, such as odors, or substances such as fog, ice, paint, dirt, and other visually and environmentally challenging conditions where bar codes or other optically-read technologies would be useless. RF tags can also be read at remarkable speeds, in most cases responding in less than one hundred milliseconds.

A typical RF tag system 10 will contain a number of RF tags 14 and one or more interrogators 12. The three main categories of RF tags are beam-powered passive tags, battery-powered semi-passive tags, and active tags. Each operates in fundamentally different ways.

The beam-powered RF tag is often referred to as a passive device because it derives the energy needed for its operation from the interrogation signal beamed at it. The tag rectifies the field and changes the reflective characteristics of the tag itself, creating a change in reflectivity that is seen at the interrogator. A battery-powered semi-passive RFID tag operates in a similar fashion, modulating its RF cross-section in order to reflect a delta to the interrogator to develop a communication link. Here, the battery is the source of the tag's operational power just for auxiliary circuit. Finally, in the active RF tag, a transmitter is used to create its own radio-frequency energy powered by the battery.

The range of communication for such tags varies according to the transmission power of the interrogator 12 and the RF tag 14. Battery-powered tags operating at 2,450 MHz have traditionally been limited to less than ten meters in range. However, devices with sufficient power can reach up to 200 meters in range, depending on the frequency and environmental characteristics.

An example of an active RFID system is found in U.S. Pat. No. 6,061,614 for an electronic tag including RF modem for monitoring motor vehicle performance. Here, a tag has a transceiver for transmitting data to and receiving data from a host, and the tag is coupled to a bus in the motor vehicle for receiving data from various systems in the motor vehicle regarding motor vehicle performance. In this use of radio-frequency technology, the tag is powered by the electrical system of the motor vehicle because of the substantial power requirements for operating the various components of the tag.

There is a need for a tag that can operate on power from the received radio-frequency signal only and that is of a lightweight, small size, and low cost to manufacture, and which can utilize input and output signals for onboard or remote components, circuits, or devices.

BRIEF SUMMARY OF THE INVENTION

The disclosed embodiments of the invention are directed to a microprocessor-based radio-frequency transponder, and to a corresponding system, that monitors inputs and controls outputs for internal and external applications while extracting operational power from received radio-frequency signals. The microprocessor or microcontroller utilizes input and output control pins adapted for connection to an external device that can be remotely controlled via the RF transponder. Inputs may include both analog and digital signals that can be used for such things as monitoring temperatures, voltages, and switch status information. Outputs may include controlling switches, changing volumes, controlling currents, and the like.

In accordance with one embodiment of the invention, a radio-frequency transponder device is provided that includes an antenna circuit configured to receive radio-frequency signals and to return modulated radio-frequency signals via continuous wave backscatter in response to the received radio-frequency signals; a modulation circuit coupled to the antenna circuit and configured to modulate the received radio-frequency signals and generate the modulated radio-frequency signals; and a microprocessor coupled to the antenna circuit and configured to receive operating power from the received radio-frequency signals and further configured to monitor inputs on at least one input pin and to generate responsive signals to the modulation circuit for modulating the radio-frequency signals in response to an input signal received on the at least one input pin.

In accordance with another aspect of the foregoing embodiment, the device includes at least one input and output pin, and wherein the microprocessor circuit is configured to generate an output on the at least one input/output pin in response to the received radio-frequency signals.

In accordance with yet another aspect of the foregoing embodiment, the device further includes an electrical energy storage device for storing electrical energy and supplying power to the microprocessor circuit. The stored electrical energy may come from the received RF signal or it may be a battery.

In accordance with yet another embodiment of the invention, the device is configured to operate in conjunction with an external device coupled to the at least one input pin for sending input signals to the microprocessing circuit.

In accordance with a further embodiment of the invention, a radio-frequency transponder system is provided that includes an interrogation circuit for generating radio-frequency signals and for receiving modulated radio-frequency signals; an antenna circuit configured to receive radio-frequency signals and to return modulated radio-frequency signals via continuous wave backscatter in response to the received radio-frequency signals; a modulation circuit coupled to the antenna circuit and configured to modulate the received radio-frequency signals and generate the modulated radio-frequency signals; and a microprocessor coupled to the antenna circuit and configured to receive operating power from the received radio-frequency signals and further configured to monitor inputs on at least one input pin and to generate responsive signals to the modulation circuit for modulating the radio-frequency signals in response to an input signal received on the at least one input pin.

The advantages of the foregoing embodiments of the invention are many, including rendering items such as night-vision goggles useless should they be removed from a warehouse without authorization; tamper detection tags that can indicate if an item has been tampered with; and temperature monitoring tags that would indicate if an item has gone above or below a preset limit.

BRIEF DESCRIPTION OF THE SEVERAL VIEWS OF THE DRAWING(S)

The foregoing features and advantages of the disclosed embodiments of the invention will be more readily appreciated as the same become better understood from the following detailed description when taken in conjunction with the accompanying drawings, wherein.

DETAILED DESCRIPTION OF THE INVENTION

Figure 1:
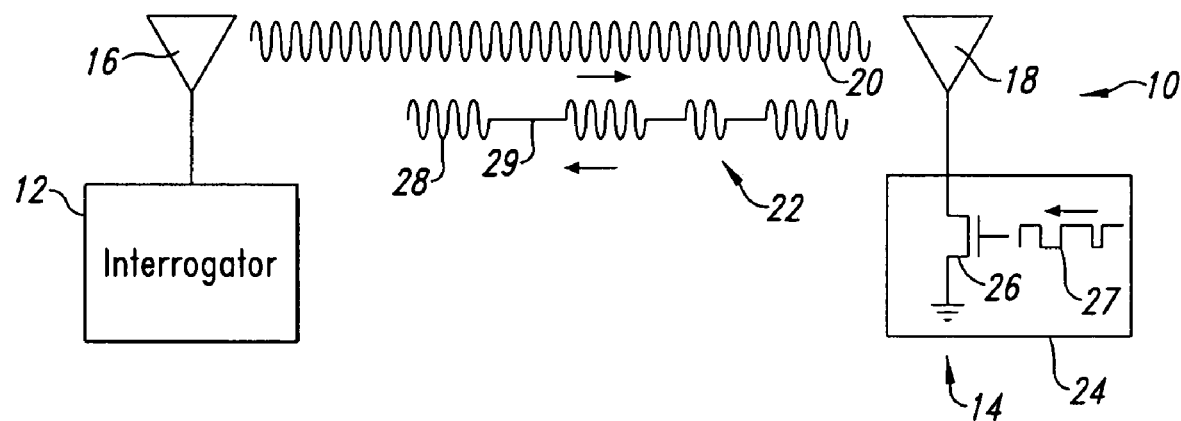
FIG. 1 is a diagram illustrating a known radio-frequency identification system.
Figure 2:
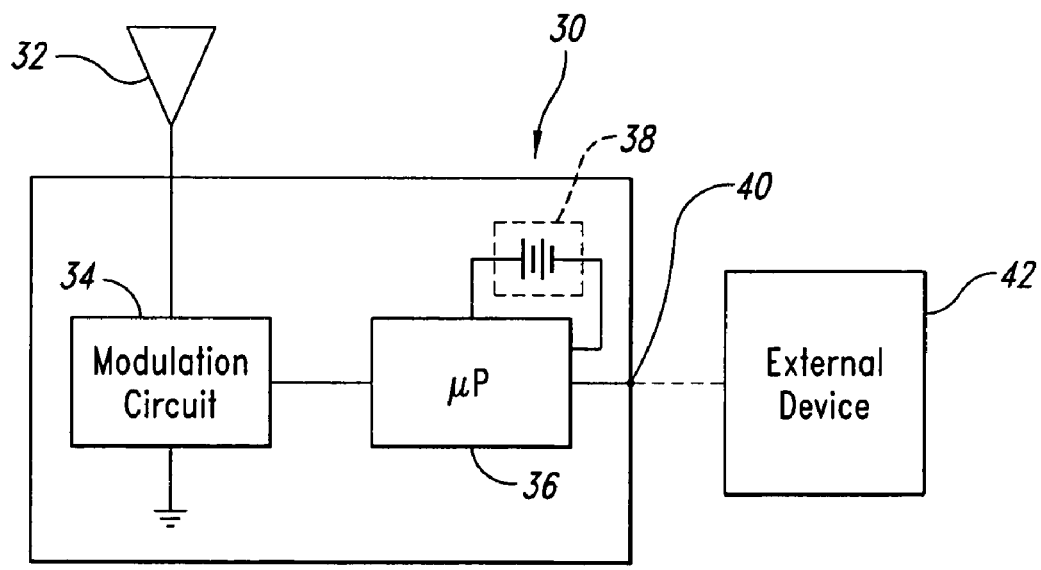
FIG. 2 is a schematic of one embodiment of a microprocessor-based radio-frequency transponder formed in accordance with the present invention.

In accordance with one embodiment of the invention, a radio-frequency transponder device 30 is shown in FIG. 2 having an antenna 32 coupled to a modulation circuit 34 that is configured to receive radio-frequency signals through the antenna circuit 32 and to generate modulated radio-frequency signals in response thereto. A microprocessor 36 is coupled to the antenna circuit 32 and is configured to receive and extract operating power from the received radio-frequency signals.

An optional electronic storage device 38 (shown in phantom) is coupled to the microprocessor 36 for storing electrical energy to be used in supplying power to the microprocessor 36. Although the use of an electronic storage device 38 is not preferred, it is an optional feature to be used in certain applications. The electronic storage device 38 can be any device that stores electrical energy for extended periods of time, such as a capacitor, or for short periods of time, such as an inductor. Alternatively, the storage device 38 can itself include or be a circuit that extracts and stores electrical power from the antenna circuit 32. If desired, the electrical storage device 38 can also be a battery or other device having pre-stored electrical energy, and such a battery can be of the replaceable or rechargeable type. In the preferred embodiment, power is extracted from the received radio-frequency signal, preferably operating in the microwave frequency range, in order to maintain simplicity of design, light weight, low cost, and ease of use.

The microprocessor circuit 36 is configured to monitor at least one input pin 40 that is adapted to be coupled to an external device 42, preferably by hardwire. Although a wireless connection is possible, it is not preferred due to complexity, cost, and weight. The microprocessor receives an input signal on the pin 40 and generates responsive signals to the modulation circuit 34 to which it is coupled. The pin 40 can also be an input-and-output pin or dedicated input pins and output pins or any combination thereof. The microprocessor circuit 36 is then configured to generate output signals via an output pin to the external device 42. The microprocessor circuit 36 can be of the type that can receive and generate both analog and digital signals.

The microprocessor 36 is preferably of the CMOS type or similar technology that consumes very little power, making it suitable for use in a remote transponder that is powered solely by energy extracted from a received radio-frequency signal. Ideally, the microprocessor is of the integrated type, and it is integrated with the other components to form a compact and lightweight transponder with enhanced capabilities.

Figure 3:
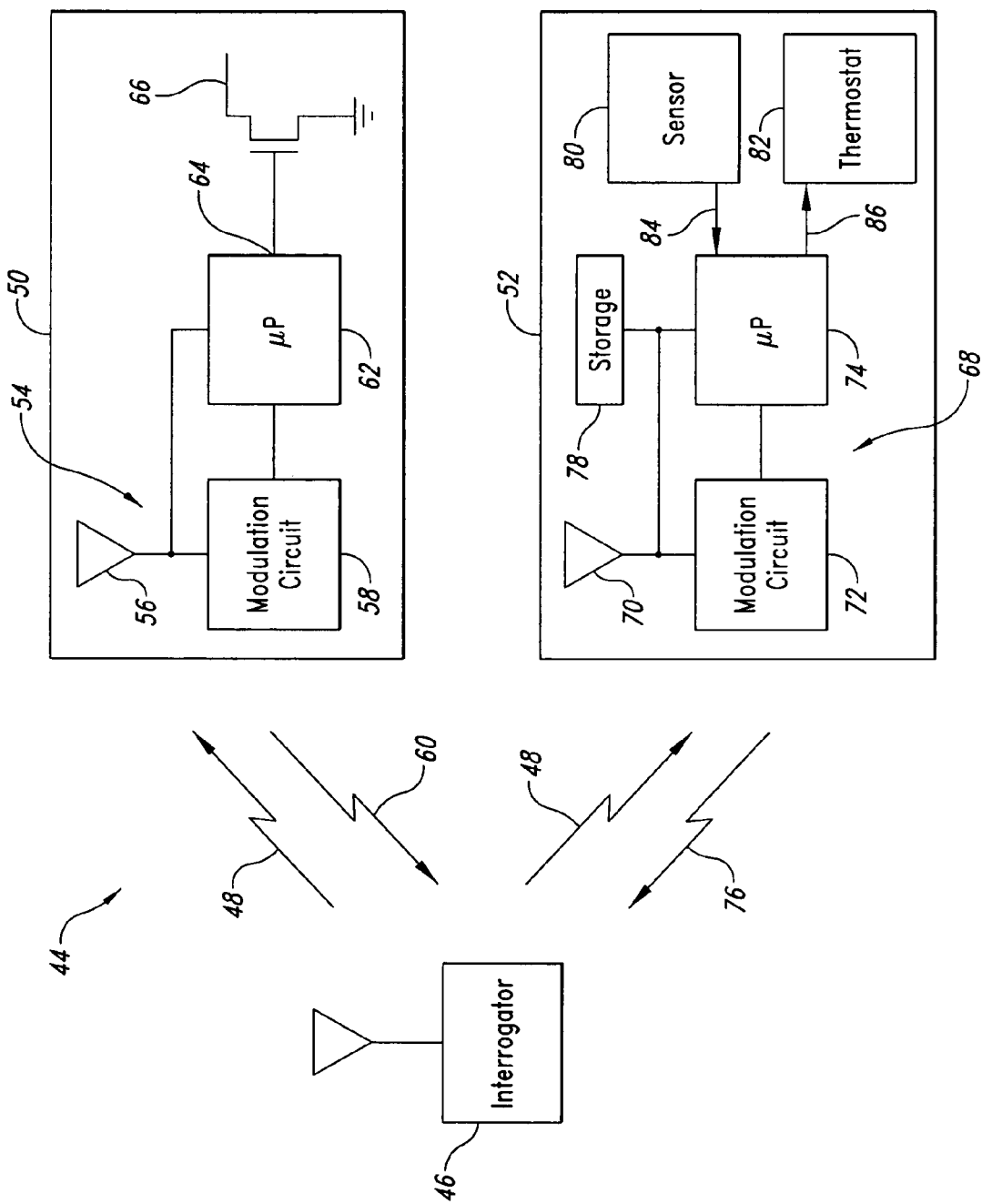
FIG. 3 is a schematic of a radio-frequency identification system utilizing the microprocessor-based transponder of FIG. 2.

Referring next to FIG. 3, shown therein is a schematic of a radio-frequency identification system 44 utilizing the microprocessor-based transponder of the present invention. More particularly, the system 44 includes an interrogator 46 configured to transmit radio-frequency signals 48, preferably microwave signals operating in the range of 2400 MHz to 2500 MHz, and in one embodiment from 2402 MHz to 2485 MHz, that are received in a first device 50 and a second device 52. It is to be understood that additional devices can be included in the system. Each device 50, 52 can be identical or separate devices such as night vision goggles, weapons, refrigeration units, etc.

The first device 50 has a transponder circuit 54 formed thereon or in connection therewith, or in the alternative attached thereto. The transponder circuit 54 includes an antenna 56 coupled to a modulation circuit 58 and configured to receive the radio-frequency interrogation signal 48 and to return a modulated radio-frequency signal 60 via continuous wave backscatter. A microprocessor circuit 62 is coupled to the antenna 56 and the modulation circuit 58. In one embodiment, the microprocessor includes a circuit to extract electrical power from the received radio-frequency signal on the antenna 56 for its operational power; however, in this embodiment, electrical energy is extracted by an extractor circuit 80 (shown in more detail in FIG. 4). The microprocessor 62 is configured to receive control signals from the modulation circuit 58 and to send signals to the modulation circuit 58 regarding the status of the microprocessor circuit 62 for encoding or modulating the radio frequency signals 60 to be reflected to the interrogator 46. An output pin 64 on the microprocessor 62 is coupled to a switch 66 where control signals from the microprocessor 62 determine the operation of the switch 66.

The switch 66 can be used to control operation of an object, such as a weapon or a transmitter or any device that is adaptable for control by the switch 66. The microprocessor is also configured in one embodiment to provide the modulation circuit with a signal concerning the status of the switch 66, i.e., whether the switch is open, closed, or conducting, non-conducting or at any point therebetween.

The second device 52 also includes a transponder circuit 68 comprising an antenna 70 coupled to a modulation circuit 72 as well as to a microprocessor 74. The modulation circuit 72 and antenna 70 are configured to receive the radio-frequency signals 48 from the interrogator 46 and to return a modulated radio-frequency signal 76 via continuous wave backscatter. Coupled to the microprocessor 74 and the antenna 70 is an electrical power storage device 78 adapted to extract and store power from the received radio frequency signal 48 on the antenna 70 and to provide the same to the microprocessor 74. Alternatively, the electrical power storage device 78 can also provide power to additional components associated with the device 52, in this case a sensor 80 and a thermostat 82.

More particularly, the microprocessor 74 has an input pin 84 configured to receive input signals from the sensor 82, such as signals regarding the temperature of the device 52. The microprocessor 74 also has an output pin 86 coupled to the thermostat 82 for sending operational control signals thereto. The output pin 86 may also be an input/output pin configured to receive signals from the thermostat 82 as to the condition or status of the thermostat 82.

The transponders 54, 68 in the devices 50, 52 are preferably passive transponders that operate from the power received from the radio-frequency signals 48 transmitted from the interrogator 46. Thus, the microprocessors 62, 74 are configured to extract and utilize the power from those received signals. The power extracted therefrom can also be supplied to devices coupled to the switch 66 in the device 50, as well as to additional circuits or components, such as the sensor 80 and thermostat 82 in the device 52. In the alternative, an electrical power storage device 78 can be utilized as described above for providing power to the microprocessor 74 and the additional devices, as needed, when a radio-frequency signal 48 is not received from the interrogator 46 or is of insufficient power, either due to a weak transmission or a great distance between the interrogator 46 and the device 52. As discussed above with respect to FIG. 2, the storage device 78 can be a capacitor, a coil, or other components known to those skilled in the art for extracting, storing, and providing electrical energy. Alternatively, although not preferred, the storage device 78 can be a charged electrical energy cell that is a one-time use or rechargeable.

Figure 4:
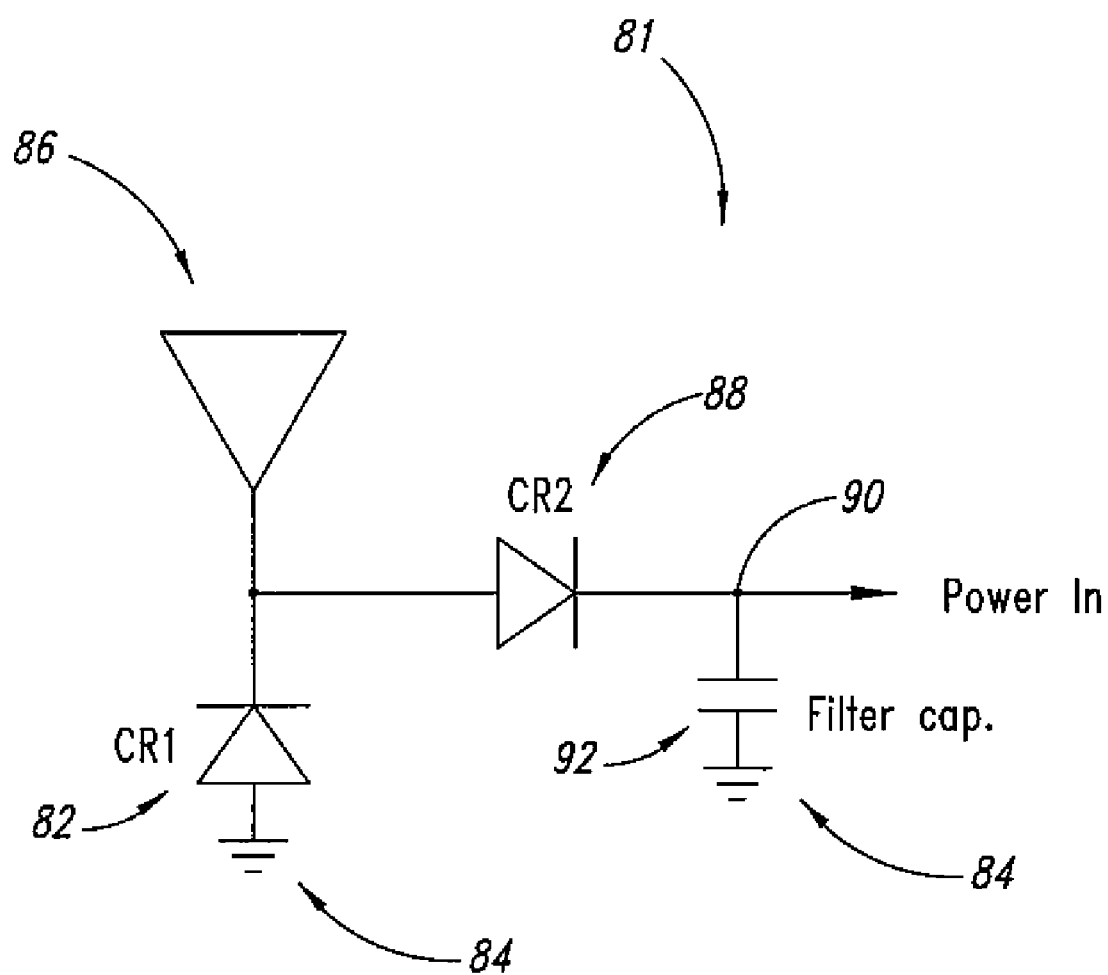
FIG. 4 is a schematic of an extractor circuit for extracting power from the received radio frequency signal.

FIG. 4 illustrates an extractor circuit in which a first diode 81, preferably a Schottkey diode, is coupled between a ground reference potential 84 and the antenna 86, and a second diode 88, preferably a Shottkey diode, is coupled between the antenna 86 and a power-in node 90. A filter capacitor 92 is coupled between the ground reference potential 84 and the power-in node 90. The received radio-frequency signals are rectified through the extractor circuit 81 to obtain operating current for use by the microprocessor, and when available for storage for later use. This particular extractor circuit is preferred because it is easily integrated in a semiconductor circuit.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A radio-frequency transponder device for use with external devices, comprising:
    an antenna circuit configured to receive radio-frequency signals and to return modulated radio-frequency signals via continuous wave backscatter in response to the received radio-frequency signals in the range of 2400 MHz to 2500 MHz;
    a modulation circuit coupled to the antenna circuit and configured to generate the modulated radio-frequency signals in response to the received radio-frequency signals; and
    a low-power CMOS microprocessor coupled to the antenna circuit and configured to receive operating power from the received radio-frequency signals and to output power from the received signals to the external devices and further configured to monitor inputs on at least one input pin and to generate responsive signals to the modulation circuit for modulating the radio-frequency signals in response to an input signal received on the at least one input pin, the at least one input pin comprising at least one input-and-output pin, and wherein the microprocessor is configured to generate an output on the at least one input-and-output pin in response to the received radio-frequency signals, the microprocessor adapted to process both analog and digital signals.

2. The device of claim 1, further comprising an electrical energy storage device for storing electrical energy and supplying power to the microprocessor circuit.

3. The device of claim 1, further wherein the at least one input pin is configured to be coupled to an external device for receiving input signals to be processed by the microprocessing circuit.

4. The device of claim 2, wherein the electrical energy storage device is configured to receive and store electrical energy from the received radio-frequency signals.

5. A radio-frequency identification system for use with external devices, comprising:

an interrogation device for generating radio-frequency signals and for receiving modulated radio-frequency signals in the range of 2400 MHz to 2500 MHz; and a transponder device, comprising:

an antenna circuit configured to receive the radio-frequency signals and to return modulated radio-frequency signals via continuous wave backscatter in response to the received radio-frequency signals;

a modulation circuit coupled to the antenna circuit and configured to generate the modulated radio-frequency signals in response to the received radio-frequency signals; and a low-power CMOS microprocessor coupled to the antenna circuit and configured to receive operating power from the received radio-frequency signals and to output power from the received signals to the external devices and further configured to monitor inputs on at least one input pin and to generate responsive signals to the modulation circuit for modulating the radio-frequency signals in response to an input signal received on the at least one input pin, the microprocessor adapted to process analog and digital signals, the at least one input pin comprising at least one input-and-output pin, and the microprocessor configured to generate an output on the at least one input-and-output pin in response to the received radio-frequency signals.

6. The system of claim 5, further comprising an electrical energy storage device for storing electrical energy and supplying power to the microprocessor circuit.

7. The system of claim 5, further wherein the at least one input pin is configured to be coupled to an external device for receiving input signals to be processed by the microprocessing circuit.

8. The system of claim 5, wherein the electrical energy storage device is configured to receive and store electrical energy from the received radio-frequency signals.

9. A radio-frequency transponder system for use with at least one external device, comprising:

means for generating radio-frequency signals and for receiving modulated radio-frequency signals;

means for receiving the radio-frequency signals and for returning the modulated radio-frequency signals in response thereto, the modulation means configured to extract operating power from the received radio-frequency signals; and means for processing at least one input signal received on at least one input pin, the processing means comprising a low-power CMOS microprocessor coupled to the receiving means and adapted to extract operating power from the received radio-frequency signals and to provide the extracted power to the at least one external device, the processing means coupled to the modulation means and configured to generate a control signal to the modulation means in response to the received input signal from the at least one input pin comprising at least one input-and-output pin, and wherein the microprocessor is configured to generate an output on the at least one input-and-output pin in response to the received radio-frequency signals, the microprocessor adapted to process both analog and digital signals.

10. The system of claim 9 wherein the at least one input pin and the at least one output pin are adapted for connection to the at least one external device.

11. The system of claim 9, further comprising means for storing electrical power, the storing means coupled to the processing circuit for supplying operating power to the processing circuit.

12. The system of claim 11, wherein the storing means is configured to store electrical energy extracted from the received radio-frequency signal.

* * * * *